Aug. 1, 1944.    W. A. BUEHLER    2,354,794
APPARATUS FOR MANUFACTURING TANKS AND THE LIKE
Original Filed Nov. 18, 1939    2 Sheets-Sheet 2
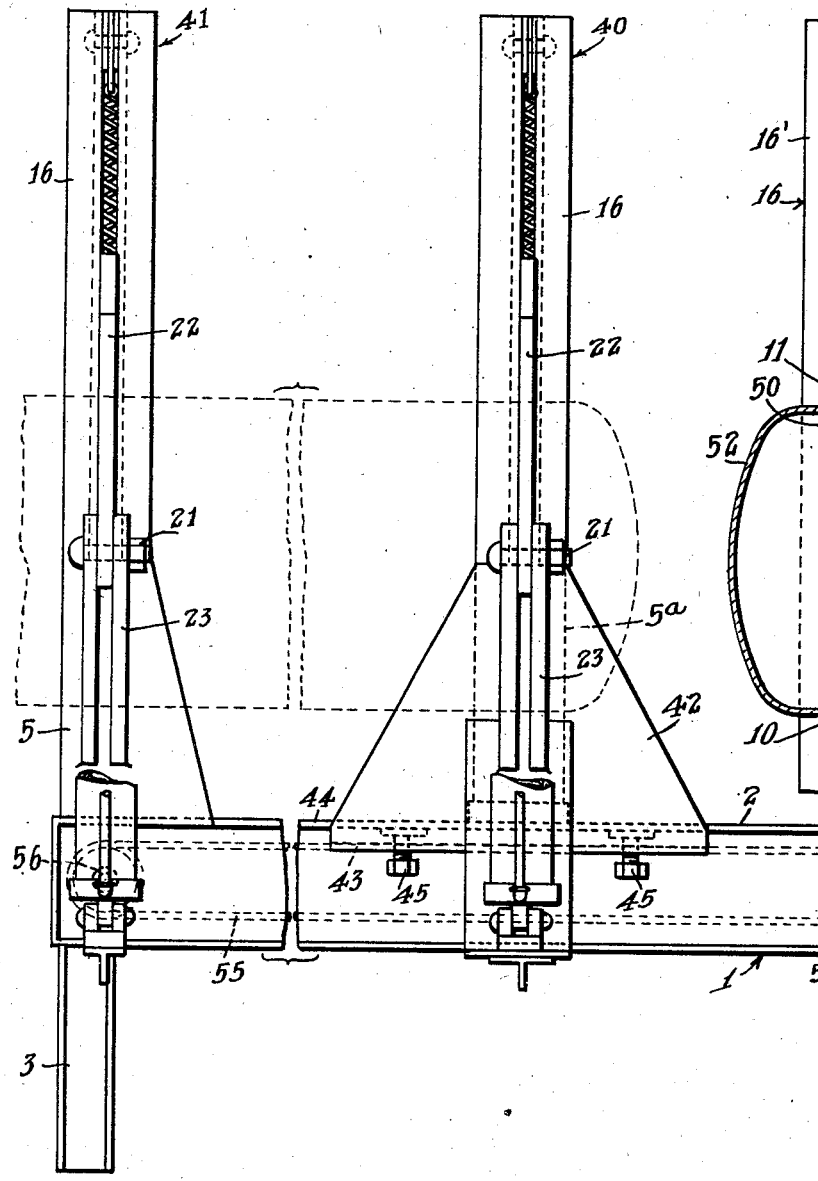
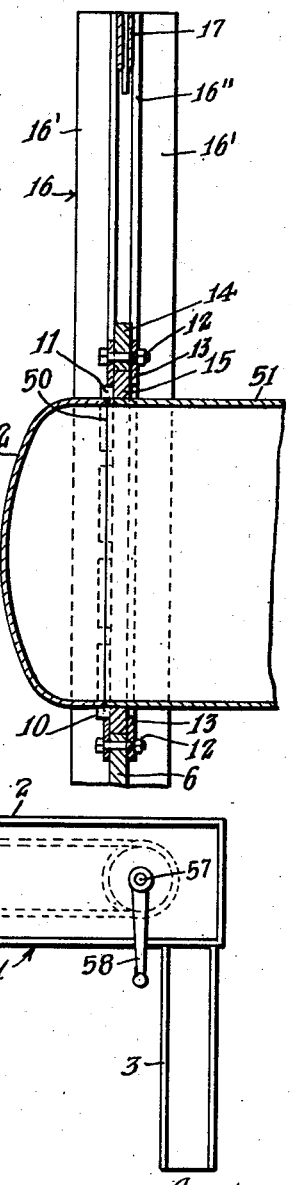
Inventor
Walter A. Buehler
By Lyon & Lyon
Attorneys Patented Aug. 1, 1944

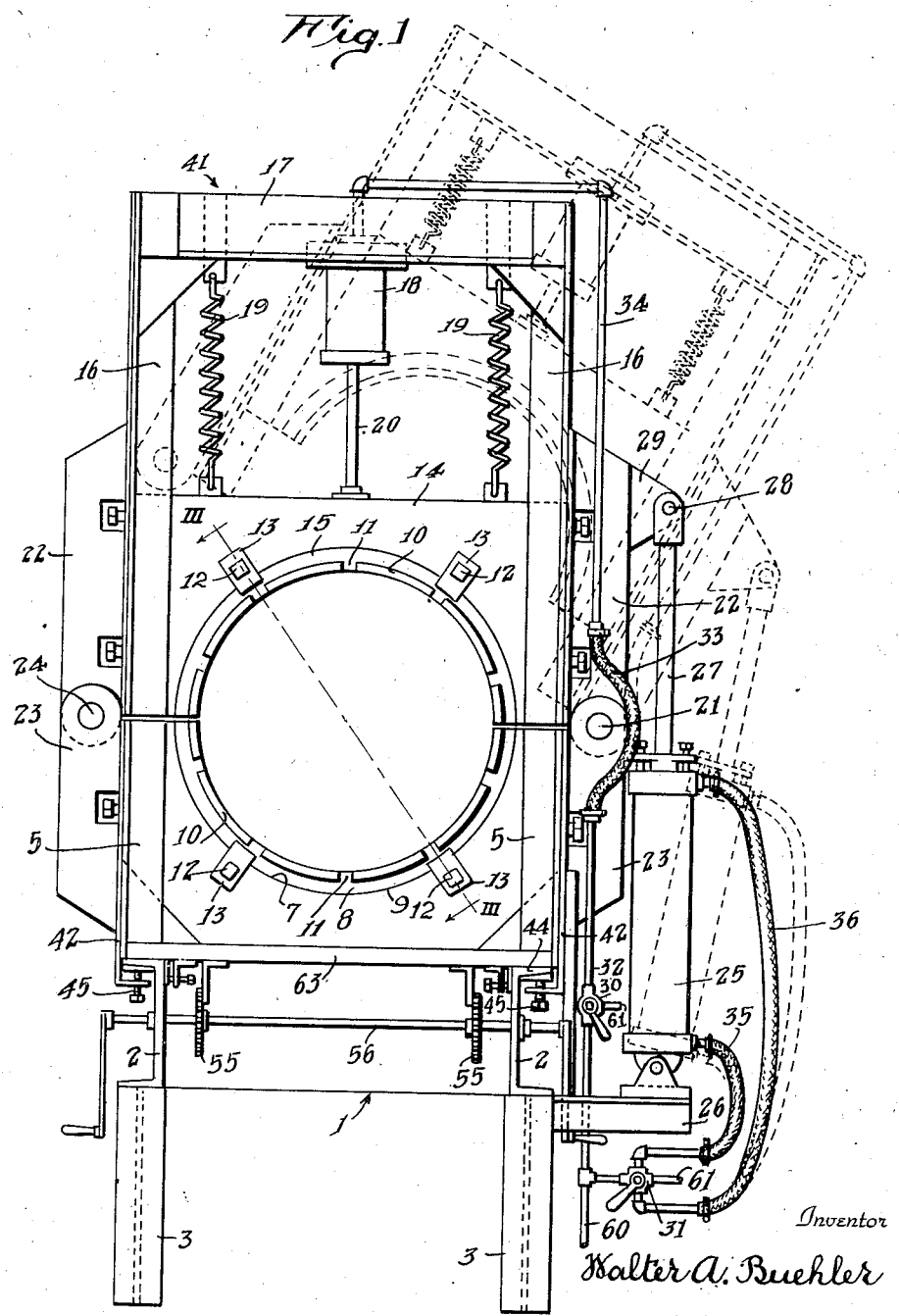

2,354,794

UNITED STATES PATENT OFFICE 2,354,794

APPARATUS FOR MANUFACTURING TANKS AND THE LIKE

Walter A. Buehler, Cucamonga, Calif.

Original application November 18, 1939, Serial No. 305,130. Divided and this application October 22, 1941, Serial No. 416,091

2 Claims. (Cl. 113—102)

This invention relates to the butt welding of relatively large cylindrical bodies, such as pipe sections or tank sections.

The present application is a division of my application Serial No. 305,130, filed November 18, 1939, for Method of and apparatus for manufacturing tanks and the like.

A broad object of the invention is to increase the accuracy of alignment of the parts and to speed up the operation.

A more specific object is to provide a jig that can be rapidly opened and closed for holding two hollow cylindrical members to be joined in accurately abutting relation while they are being welded together.

Still another object is to provide a jig of the type referred to that can readily be adjusted to hold tanks or pipes of different sizes.

Other more specific objects and features of the invention will become apparent from the detailed description of a preferred embodiment of the invention, to follow:

In butt welding relatively large pipe sections and the like, it is difficult to position the abutting ends of the two sections in perfect registration with each other unless both ends are perfect circles, which is rarely the case. In most instances it has been necessary to align different peripheral portions of the abutting ends, one at a time, and weld such portions together before proceeding to another portion. This method is slow and expensive, particularly when the sections to be welded are large and stiff.

In accordance with the present invention, I provide a jig that engages against the outer peripheral surfaces of the two sections to be welded, substantially over their full circumference, and forces all portions of the abutting ends into perfect alignment. While so held, the two sections are welded together at peripherally spaced points through recesses provided in the work-engaging jaws of the jig for that purpose. Thereafter the sections are removed from the jig and the welding of the joints completed, the initial spaced welds holding the parts in alignment during the final welding operation.

My apparatus will now be explained more fully by describing in detail a particular embodiment of the apparatus as disclosed in the drawings, in which Fig. 1 is an end elevation of the apparatus;

Fig. 2 is a side elevation view looking at the right side in Fig. 1; and

Fig. 3 is a detail sectional view taken substantially in the plane III—III of Fig. 1.

Referring first to Figs. 1 and 2, my machine includes a horizontal frame 1 having as its main elements a pair of parallel spaced apart rails 2, each of these rails 2 as shown being of channel section with the flanges facing outwardly away from each other. These rails 2 may be supported at opposite ends on legs 3.

Mounted on the rails 2 adjacent one end thereof is a cross member 63 to which a pair of uprights 5 are secured. The uprights 5 support a form plate 6 which may consist of a heavy plate of steel approximately 1½ inches in thickness and having in its upper edge a semicircular opening 7. Positioned in this semicircular opening 7 is a detachable jaw 8 having an outer semicircular edge 9 fitting snugly against the edge 7 of plate 6 and flush therewith. The jaw 8 has flanges 10 on one edge thereof for providing a bearing surface of increased width for contacting the tank or pipe being worked upon. The flanges 10 are interrupted by recesses 11 which permit access to the joint to be welded, as will appear later.

The jaw 8 may be secured in place by bolts 12 extending through stirrups 13 and the plate 6, the stirrups 13 being secured to the removable jaw member 8 and straddling the plate 6 (Fig. 3).

Cooperating with the lower plate 6 and its associated jaw member 8 is an upper plate 14 and an associated jaw member 15. Plate 14 is slidably mounted for vertical movement in guide members 16 which extend vertically above the members 5. Thus each of the members 16 may consist of a pair of angle members 16' (Fig. 3) with their flanges 16" positioned in spaced apart relation to receive therebetween the edges of the plate 14.

The upper ends of the two vertical members 16 are rigidly interconnected by a cross head 17 carrying a hydraulic cylinder 18. The plate 14 is normally maintained in elevated position by a pair of tension springs 19 connected at opposite ends to the plate 14 and the cross head 17, respectively. However, by supplying pressure fluid to the upper end of cylinder 18 a piston within the cylinder may be forced down to move a piston rod 20 which is connected to the plate 14, thereby driving the plate 14 into the lowermost position, as shown in Fig. 1, in which plate 14 rests against plate 6 and the jaw 15 cooperates with the jaw 8 to define a circular work-receiving opening.

In order to facilitate insertion and removal of work into and from the machine, the upper structure comprising the plate 14, uprights 16 and cross head 17 is hingedly mounted on the lower structure. Thus one of the uprights 16 (the one on the right in Fig. 1) is connected by a hinge pin 21 to the upright 5 therebelow, the hinge pin 21 serving to hingedly connect two members 22 and 23 rigidly secured to the upright 16 and the upright 5, respectively. Likewise on the other side of the machine the members 5 and 16 have rigidly attached thereto members 23 and 22, respectively, adapted to be interconnected by a pin 24. However, whereas the hinge pin 21 is ordinarily left in position permanently to function as a hinge pin during opening movement of the mechanism, the pin 24 is removed whenever the press is opened and reinserted when the press is closed to function as a locking bolt.

To open and close the mechanism, a hydraulic cylinder 25 is provided, this cylinder being hingedly secured at its lower end to a bracket 26 supported from the track member 2. The cylinder 25 contains a piston attached to a piston rod 27, which extends through the upper end of cylinder 25 and is hingedly connected, as by a pin 28, to a bracket 29 extending outwardly from the upper end of the member 22. When the pin 24 is removed, and fluid pressure is supplied to the upper end of cylinder 25, the piston rod 27 is moved downwardly to rock the upper structure in clockwise direction about the hinge pin 21 as an axis, the dotted lines in Fig. 1 showing the upper structure in partly open position. When the fluid is released from the upper end of cylinder 25, and fluid supplied to the lower end of the cylinder, the mechanism swings back into the solid line position.

Pressure fluid to actuate the pistons in the cylinders 18 and 25 may be fed from a supply pipe 60 through a control valve 30, a pipe 32, a flexible hose 33 and a pipe 34 to the cylinder 18, and through a four-way valve 31 either to a hose 35 leading to the lower end of cylinder 25 or to a hose 36 leading to the upper end of cylinder 25. The lower end of the cylinder 18 may be vented to atmosphere at all times. The valve 30 in one position connects the pipe 32 to the pressure fluid supply line 60, and in another position connects the pipe 32 to an exhaust pipe 61. The valve 31, in one position connects hose 35 to the pressure fluid supply line 60 and hose 36 to the exhaust pipe 61, and, in another position, connects hose 36 to the supply line 60 and hose 35 to the exhaust 61.

Referring now to Fig. 2, in addition to the mechanism described as permanently fixed to one end of the track 1, and identified as mechanism 41 in Figs. 1 and 2, I also provide a similar mechanism 40 which is movable longitudinally along the track 1. Thus this mechanism 40 includes members 5a, similar to the members 5 of the mechanism 41, except that the lower ends of these members 5a rest loosely on the upper surfaces of the rails 2 and are adapted to be detachably locked thereto in any longitudinal position desired. Thus there is attached to the outer faces of each of the members 5a a triangular plate 42 which extends down below the lower end of the member 5a and is inturned to form a flange 43 which extends below the upper flange 44 of the associated rail 2. Bolts 45 extend through this flange 43, being threaded therein, so that by tightening the bolts 45 the mechanism 40 can be locked rigidly in any desired spaced relation to the mechanism 41.

The mechanism desired is particularly useful in welding heads to cylindrical tank bodies. The procedure in such instances is to first open up both of the mechanisms 40 and 41 by releasing fluid from the cylinders 18 and supplying fluid to the upper ends of cylinders 25, which moves both mechanisms through the position shown in dotted lines in Fig. 1, into the fully open position. The tank body is then moved into place, resting in the lower jaws 8 in the mechanisms 40 and 41, it being understood that the mechanism 40 has previously been locked to the rail 2 in such a longitudinal position therealong as to cause the ends of the tank body to be substantially midway between the edges of the flanges 10 so that the edges are exposed at the recesses 11. Fluid is then released from the upper ends of cylinders 25 and supplied to the lower ends of those cylinders, causing the upper portion of each of the mechanisms 40 and 41 to swing about its pivot pin 21 into closed position, whereupon the pins 24 are inserted to lock the members in closed position.

As yet, the upper plates 14 are retained in upper position by the springs 19. The end members of the tank are next placed in position abutting the respective ends of the tank body and while the end members are held in this position, fluid is admitted to the cylinders 18 to bring the upper jaws 15 down into lowermost position, in which they tightly grip both the tank body and the end members adjacent the abutting edges thereof. The end members are thereby positively held in accurate alignment with the tank body while they are spot welded to the body member at peripherally spaced intervals; this welding being accomplished through the recesses 11 between the flange members 10. Thus, as shown in Fig. 3, the abutting edges 50 of a tank body 51 and a tank end 52 are positioned between the edges of the flange members 10 and are accessible, through the recesses 11, to the welding tool.

Of course the jaws 8 and 15 are suitably proportioned to fit the particular tank being welded, and are dimensioned so that the inner periphery of the opening defined by the jaws 8 and 15 is exactly the same as the periphery of the tank being worked upon. Therefore even though the tank and the end member may not be perfectly round, they are forced into round shape by the jig so that they register perfectly all the way around. When welded together at the spaced intervals defined by the recesses 11, the tank and ends will be retained in aligned position so that the assembly can be removed from the jig and the weld completed either by hand or in a suitable welding machine.

Obviously, to remove the tank after the ends have been spot welded thereto, the fluid is first released from the cylinder 18, permitting the springs 19 to lift the upper plate 14, after which the pins 24 are removed and fluid is supplied to the upper ends of cylinders 25 to rock the upper portions of the mechanisms 40 and 41, into the open position. The tank is then lifted out of the jig, after which the entire operation may be repeated with another tank.

The specific jig described permits the welding of two points simultaneously. Of course if it is desired to weld only one joint at a time, then the upper portion of the structure 40 may be eliminated, and, in fact, the structure 40 can be reduced to a mere support for one end of the tank.

It will also be obvious that, if desired, additional mechanism 40 may be mounted at spaced intervals along the rails 2 to adapt the apparatus for some particular types of work. Thus if two relatively long pipe sections are to be butt welded together, it would be desirable to have a central mechanism 40, as described, together with supporting mechanisms on both sides thereof for supporting the outer ends of the pipe.

To facilitate longitudinal adjustment of the mechanism 40 along the rails 2, various mechanisms may be provided. A simple mechanism that is suitable is illustrated in Figs. 1 and 2 and consists of a pair of chains 55 looped over sprockets provided on a pair of shafts 56 and 57 at opposite ends of the track 1, these shafts 57 extending through the webs of the channel rail members 2. A crank 58 may be provided on one end of one or both of the shafts 56. Each of the chains 55 is permanently attached to the mechanism 40 so that by rotating either one of the cranks 58 both chains 55 will be moved in the same direction, carrying the mechanisms 40 along the rails 2 in one direction or the other.

As described, the work-engaging jaws 8 and 15 define a circular opening. Usually tanks or pipes are made as nearly circular as possible. However, the jaws may, if desired, be shaped to define oval or other noncircular openings. Therefore, the expression "tubular" as used in the claims is not intended to limit the invention to use with hollow cylindrical workpieces. The important feature is that the peripheral length of the work-receiving opening be substantially the same as the peripheral length of the workpiece.

Various other modifications can be made in the particular structure described, which is merely illustrative of the invention, and the latter is to be limited only as set forth in the appended claims.

I claim:

1. Apparatus for supporting a pair of tubular members in abutting relation comprising: a main frame, a lower form member fixedly mounted on said frame, an upper form member cooperating with said lower form member to define a work-receiving opening, and means supporting said upper form for linear movement toward and away from said lower form to engage and then release a pair of said tubular members positioned therebetween, said last-mentioned means including auxiliary frame means guiding said upper form for linear movement therewithin, and means supporting said auxiliary frame means for swinging movement on said main frame from a position in which said upper form is directly juxtaposed to said lower form into a position to one side of said lower form.

2. Apparatus for supporting a pair of tubular members in abutting relation comprising: a main frame and a lower form member fixedly mounted on said frame, a movable frame pivotally mounted on said main frame for swinging movement with respect thereto from a closed position directly above and in engagement with said main frame into a position displaced from said main frame, means for moving said movable frame between said two positions, means for detachably securing said movable frame in closed position, a lower work-engaging jaw means secured to said main frame, upper work-engaging jaw means, and means guiding it for vertical movement in said movable frame when the latter is in closed position, and power means mounted on said movable frame for moving said upper jaw member relative to said movable frame to clamp and release a workpiece positioned between said jaws.

WALTER A. BUEHLER.